Nov. 14, 1950 S. W. MOULTON 2,529,736

HETERODYNE FREQUENCY MODULATOR WITH DISTORTION COMPENSATION

Filed Dec. 15, 1948 2 Sheets-Sheet 1

INVENTOR.
STEPHEN W. MOULTON

BY
Allen V. Hazeltine
AGENT

Nov. 14, 1950 S. W. MOULTON 2,529,736

HETERODYNE FREQUENCY MODULATOR WITH DISTORTION COMPENSATION

Filed Dec. 15, 1948 2 Sheets-Sheet 2

INVENTOR.
STEPHEN W. MOULTON
BY
Allen V. Hazeltine
AGENT

Patented Nov. 14, 1950

2,529,736

UNITED STATES PATENT OFFICE 2,529,736

HETERODYNE FREQUENCY MODULATOR WITH DISTORTION COMPENSATION

Stephen W. Moulton, Philadelphia, Pa., assignor to Philco Corporation, Philadelphia, Pa., a corporation of Pennsylvania Application December 15, 1948, Serial No. 65,301

7 Claims. (Cl. 332—18)

Figures 1, 2, 3:
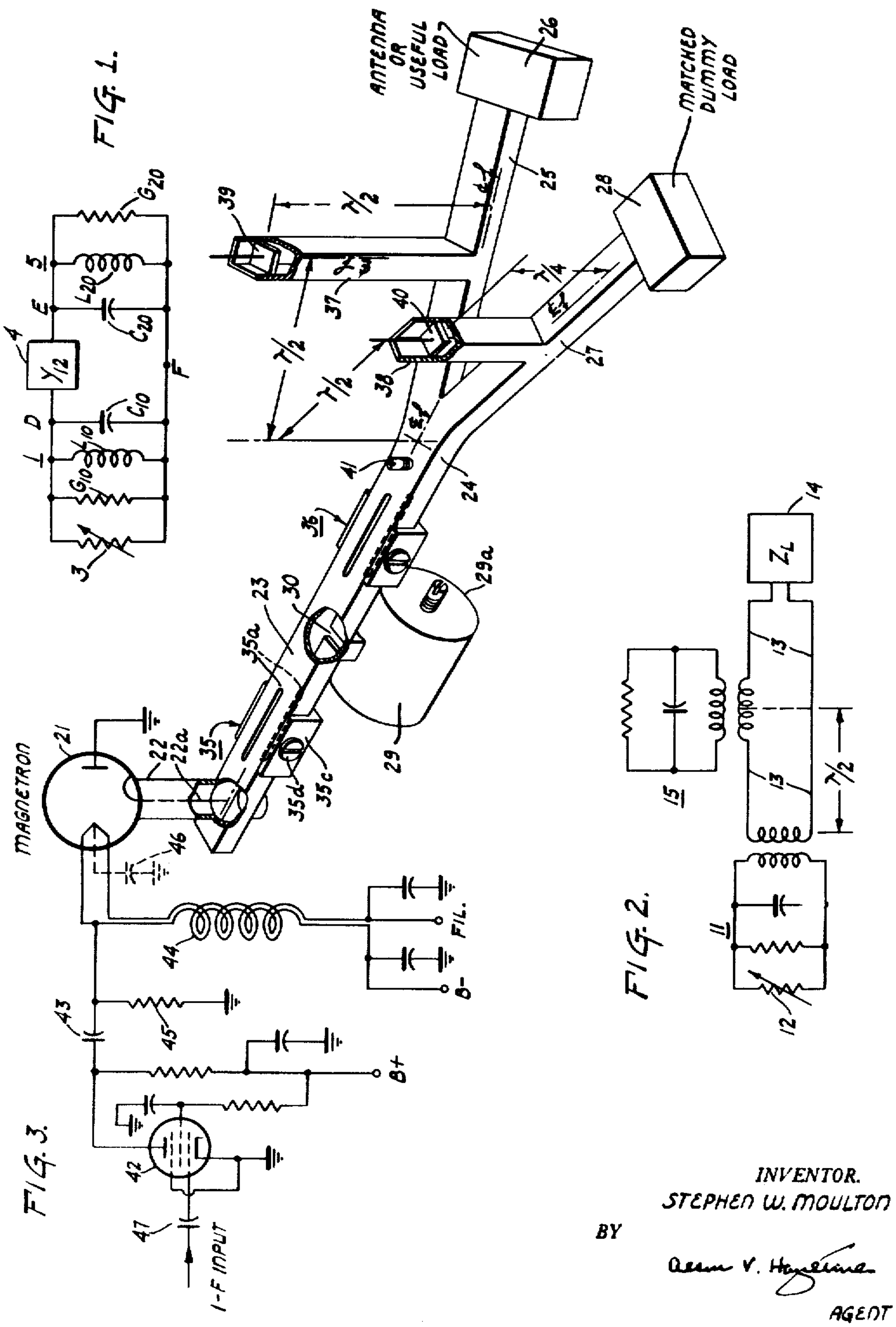

The invention herein described and claimed relates to improvements in modulating systems. More particularly it relates to improvements in heterodyne type modulating systems of the sort described and claimed in copending application of William E. Bradley for Modulation System and Method, Serial No. 787,043, filed Nov. 20, 1947, and assigned to the assignee of the present application.

As set forth in the said copending application, a heterodyne modulating system is one in which two electrical wave signals of predetermined different frequencies are mixed or heterodyned, by employing any known form of mixer, whereby there is produced, in the output from the mixer, a spectrum of signal frequency components which, among others, include components of various frequencies which are, respectively, the sums and differences of the higher of the original frequencies and integral multiples of the lower of said frequencies. If one of the original signals (e. g. the lower in frequency) is frequency-modulated, then, in the resultant output spectrum, the component whose frequency is that of the original signal of higher frequency will be of substantially constant frequency, while the components corresponding to the sums and differences of the higher original frequency and integral multiples of the lower (modulated) frequency will vary in frequency in substantial accordance with the variations in the latter frequency. One of these components may therefore be employed as a useful modulated carrier wave output signal whose carrier frequency is higher than the carrier frequency of the original modulated signal. It is to be noted, however, that the energy represented by any one of these modulated heterodyne components will, in general, be small compared to the total energy represented by all of the components in the spectrum. Moreover in general it will be substantially less than that of the component whose frequency is relatively fixed and equal to the higher of the original frequencies. Hence if one of these components is used as the useful output, the efficiency of the system is comparatively low.

The copending Bradley application is directed to the provision of a modulating system incorporating the numerous advantages of heterodyne modulation while overcoming its limitations in respect of the low power output. To this end Bradley proposed, by suitable means, to lock or to maintain substantially fixed the frequency of one of the sideband components which, as above pointed out, would normally vary in the same manner as the lower in frequency of the original input signals applied to the mixer. When this was done, the carrier component of the spectrum no longer remained fixed in frequency but was caused to vary in some degree in accordance with the modulation of the locked component which would exist if measures were not taken to maintain its frequency substantially fixed. This carrier component, whose frequency was thus caused to vary in accordance with the frequency-modulation of the original signal of lower frequency, could then be used as the useful modulated output signal and since, as above mentioned, its energy content was substantially greater than that of the locked component, the efficiency of the system was substantially improved.

In accordance with the Bradley invention, it was proposed that any suitable form of oscillator could be used as the mixer and that it could be amplitude-modulated in response to a frequency-modulated signal whose carrier frequency was lower than the normal frequency of oscillation of the oscillator. The desired output spectrum, as above mentioned, would then appear in the output of the oscillator. Locking of one of the components in this spectrum could be effected either by means of a tuned circuit of suitable Q coupled to the oscillator output circuit and tuned to the mean frequency of the component which it was proposed to lock, or by means of a separate oscillator supplying a signal of substantially constant frequency equal to the mean frequency of the component which it was desired to lock, and whose output was injected into the tank circuit of the heterodyne modulated oscillator so as to effect the desired locking. This system provided an exceedingly effective means for modulating the output of a conventional cavity magnetron and thereby provided a solution to a problem of long standing.

In a heterodyne frequency modulation system of the sort just described, if the variations in the frequency-modulated input signal occur relatively slowly, and if the locked sideband is maintained substantially fixed in frequency, the variations in frequency of the output signal will be almost directly proportional to the variations in frequency of the modulated input signal. However, as the rate of variation of the frequency of the modulated input signal increases, this proportionality will tend to be destroyed. More particularly, it is found that the variations in the output signal will no longer be proportional solely to the variations in the input signal, but will be dependent also upon the rate at which the input signal varies. In other words, the variations in the output signal will tend to become a function of the rate of change with time of the modulated input signal. This constitutes a form of distortion in the output signal which, for obvious reasons, may be highly undesirable, and to the elimination of which the present invention is directed.

Accordingly it is the primary object of my invention to provide a heterodyne modulating system of the type in accordance with the Bradley invention wherein one of the components in the output of the heterodyne modulator, which normally varies in frequency, is maintained substantially constant in frequency and its frequency variations are imparted to the carrier component in the output of the heterodyne modulator, and which further incorporates means for substantially reducing any tendency of the output signal to include a component whose frequency varies as a function of the rate of change with time of the frequency of the modulated input signal.

I have found that this objective can be achieved by including in the input circuit to the modulator a passive electrical transducer which is constructed in such a manner, as discussed more fully hereinafter, that it is operative to distort the frequency-modulated input signal so as substantially to reduce or eliminate variations in the frequency of the output signal from the heterodyne modulator which are a function of the rate of change with time of the frequency of the modulated input signal thereto.

Figure 4:
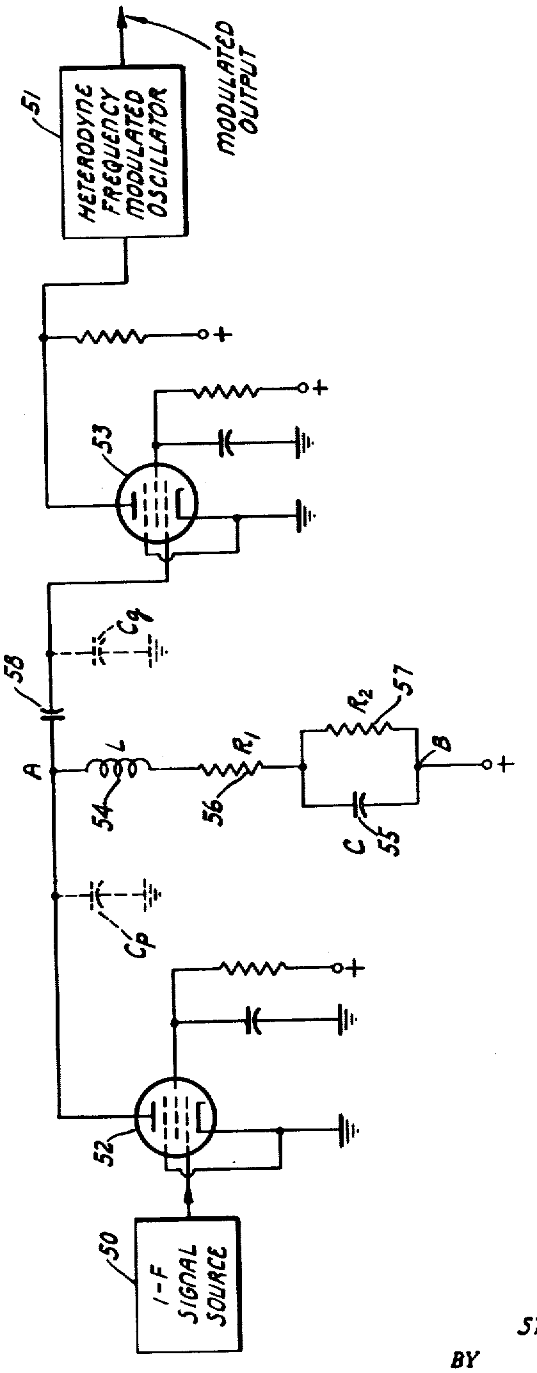

The principles of the invention and the manner of practicing it, together with other features and advantages thereof, will be more fully understood from a consideration of the following specification with reference to the accompanying drawings in which:

Fig. 1 is a schematic representation of the basic equivalent circuit of a heterodyne-modulated oscillator, Fig. 2 is a schematic representation of the equivalent circuit of a typical practical embodiment of a herterodyne-mcdulated oscillator, Fig. 3 is a representation, partially schematic and partially diagrammatic, of one practical embodiment of a heterodyne-modulated oscillator of the sort to which the present invention is applicable, and Fig. 4 is a schematic diagram illustrating a typical embodiment of the invention as applied to a heterodyne-frequency-modulated oscillator.

Before proceeding to a detailed consideration of my invention, it will be helpful first to review certain theoretical aspects of the operaticn of heterodyne-modulated oscillators generally and also of a typical practical embodiment of such a device.

Referring now to Fig. 1, which illustrates the equivalent circuit of an elementary form of heterodyne-frequency-modulator employing a magnetron oscillator, the magnetron oscillator itself is represented by the tuned circuit 1, having losses, represented by shunt conductance $G_{10}$, and shunted by a variable conductance 3 to simulate the variable conductance of the magnetron oscillator, which must be capable of assuming at least negative values. The tank circuit 1 of the oscillator is coupled, through a suitable coupling admittance 4, to an auxiliary parallel resonant circuit 5 tuned to the frequency of the sideband, in the output of the conductance modulated oscillator, which it is desired to hold fixed. Modulation of the oscillator is effected by varying conductance 3 in response to a frequency-modulated input signal. The carrier and sideband components hereinbefore referred to, as determined by the characteristics of the input signal and the frequency of oscillation of the magnetron, appear across the magnetron tank circuit 1.

Practically, however, the circuit of a heterodyne modulator may not be as simple as that represented by the equivalent circuit of Fig. 1. Rather the equivalent circuit of a practical heterodyne frequency-modulator may be as represented in Fig. 2. Here, as in Fig. 1, the magnetron is represented by parallel tuned circuit 11 shunted by a variable conductance 12, the magnitude of which varies in accordance with the instantaneous value of the modulated input signal. The oscillator tank circuit is coupled, by means of a transmission line section 13, to a signal utilization circuit 14 having an impedance $Z_L$. As illustrated, the left-hand end of this transmission line section may be inductively coupled to the oscillator tank circuit. At a point interjacent the ends of transmission line section 13, there may be inductively coupled thereto, the auxiliary tank circuit 15. If, as illustrated in the figure, the effective electrical length of the portion of the transmission line section 13, between the coupling to oscillator tank 11 and the point of coupling between auxiliary tank 15 and the transmission line section, is an odd number of half-wavelengths, at a frequency approximating that of the oscillations, then this portion of the transmission line section may be omitted completely, and the equivalent circuit of Fig. 2 is reduced to a circuit which is very similar in form to that of Fig. 1.

The apparatus arrangement illustrated in Fig. 3 may be represented by an equivalent circuit corresponding substantially to that of Fig. 2. In Fig. 3, the output of a cavity magnetron oscillator 21 is supplied through a length of coaxial transm'ssion line 22, of suitable characteristics, to one end of a waveguide section 23. The coupling between transmission line section 22 and waveguide 23 may be capacitive and is effected in conventional manner by permitting the internal conductor 22a to extend approximately halfway into waveguide 23 in a direction normal to the larger cross-sectional dimension of the guide, as illustrated. At its other end, the waveguide section is provided with a Y-junction 24 which feeds separate waveguide sections 25 and 27 having cross-sectional dimensions which are preferably almost equal to those of section 23. One of these sections, 25, is terminated in an antenna or other useful load 26, while the other section, 27, is terminated in a dummy load 28.

Coupled to waveguide section 23, at a point interjacent its juncture with transmission line section 22 and its termination in Y-junction 24, is an auxiliary cavity resonator 29, tunable by means of tuning screw 29a. The degree of coupling is determined by the width of an iris opening 30 in the lower wall of waveguide section 23, as revealed at the cut-away portion of the waveguide in the figure. In the embodiment illustrated, the coupling is magnetic by reason of the arrangement of the resonator with reference to the waveguide so that the magnetic lines of force in both resonator and waveguide, in the vicinity of the iris, are essentially parallel ($TE_{1,0}$ mode of propagation in the waveguide). However it is to be understood that similar results would be obtained using capacitive coupling. The length of that portion of waveguide section 23, between its coupling to resonator 29 and its juncture with transmission line section 22, is adjustable by means of a "line-stretcher" 35. This is formed conventionally by providing elongated slits 35a in opposite walls of the waveguide to permit small variations in the spacing of the other opposing walls of the guide to be effected by turning screw 35d in clamp member 35c. Similarly, that portion of waveguide 23 between the coupling to resonator 29 and its termination in Y-junction 24, is adjustable in length by means of a similar "line-stretcher" 36. Immediately adjacent the Y-junction there is also provided a tuning screw 41 for the purpose of modifying the voltage standing wave ratio in the waveguide section. These two last-named adjustments make it possible to vary the effective impedance level presented to the heterodyne modulator by its load, and thereby to select the optimum value for effective locking, as more fully discussed in the aforementioned Bradley application.

Waveguide sections 25 and 27 are provided, respectively, with branch portions 37 and 38, which are separately variable in effective length through the agencies of slidable pistons 39 and 40. Each of these branch sections is preferably displaced electrically, from the effective center of Y-junction 24, an integral number of half wavelengths at the fundamental frequency of magnetron oscillator 21. The effective electrical length of section 37 is adjusted to be an integral number of half wavelengths at the magnetron frequency; while that of section 38 is made substantially equal to an odd number of quarter wavelengths at the same frequency. As a result of these adjustments waveguide sections 25 and 27, and their associated sections 37 and 38, will cooperate with dummy load 28, when the impedance of the latter is made equal to that of useful load 26, to provide, in effect, a bandpass filter interposed between Y-junction 24 and antenna or useful load 26. The filter thus formed will present a substantially constant input impedance at Y-junction 24 and may be adjusted so as to transmit to the antenna or useful load the fundamental frequency component in the output from magnetron oscillator 21, to which will have been imparted variations substantially corresponding to those of the frequency-modulated I.-F. input signal, as will be explained hereinafter.

Magnetron 21, which may be a conventional C.-W. magnetron operating in the S, X or K band, is driven by a suitable driver tube, which, in this instance, is pentode 42. The plate of tube 42 is coupled through condenser 43 to the cathode of the magnetron, and the cathode leads supplying heater power thereto may include the elements of a bifilar winding 44 which is adapted to resonate with the circuit capacitance to present a suitable input impedance to the signal supplied to the cathode of the magnetron to drive it. Also, there may be included a resistor 45, connected between the magnetron cathode and ground, which cooperates with the inherent capacitance of the cathode to provide the necessary bandwidth in the coupling circuit between the driver tube 42 and magnetron 21.

The driving signal, which may be a frequency-modulated intermediate frequency carrier derived from the output of an intermediate frequency amplifier (not shown) is supplied through coupling condenser 47 to the control grid of pentode 42. From theoretical considerations it might be thought that most efficient operation of the magnetron would be obtained if the magnitude of the driving signal were adjusted so as to produce Class C operation of the magnetron (i. e. so that oscillations build up in the magnetron during only a relatively small portion of each I.-F. cycle). Actually this may not be the case because of the relatively large amount of power which is normally required to drive the magnetron Class C. Accordingly, for the achievement of optimum over-all efficiency, it may be preferable to adjust the magnitude of the I.-F. input signal applied to the control grid of tube 42 so as to cause less violent modulation of the magnetron, (i. e. so that the magnetron oscillates during a relatively large portion of each I.-F. cycle).

The frequency-modulated input signal applied to drive the magnetron will cause oscillations to build up in the magnetron intermittently at a rate which varies in accordance with the frequency-modulation of the driving signal. As a result of this mode of operation, there will exist, in the magnetron output cavity, signal frequency components corresponding to the normal frequency of oscillation of the magnetron, as well as sideband modulation components corresponding to the sums and differences of the normal frequency of oscillation of the magnetron and integral multiples of the mean or carrier frequency of the frequency-modulated driving signal. As already mentioned heretofore, the normal tendency will be for the fundamental or carrier frequency (corresponding to the natural frequency of oscillation of the magnetron) to remain substantially constant, while the frequency of the sideband components vary in accordance with the frequency modulation of the driving signal. However, in the arrangement illustrated in Fig. 3, owing to the presence of auxiliary cavity resonator 29 coupled to the magnetron output cavity through the agency of waveguide 23 and transmission line section 22 and tuned to the mean frequency of one of the sideband components, a substantial force will be exerted tending to overcome the variation in frequency of that particular sideband component and tending at the same time to produce similar variations in the frequency of the fundamental or carrier component of the magnetron output. It has been determined that such locking of a sideband component will take place where the effective electrical length of the coupling circuit between the output cavity of magnetron 21 and cavity 29, comprising transmission line section 22 and the left-hand portion of waveguide section 23, is equal to an integral number of half wavelengths. Actually it appears that this is not a critical requirement and that this length may be varied considerably without adversely affecting the ability of cavity resonator 29 to lock the selected sideband component in the output from magnetron 21.

The effectiveness of the auxiliary cavity resonator in locking the selected sideband in the output spectrum of the heterodyne frequency-modulated oscillator is of primary importance in determining the efficiency of operation of the system. This effectiveness is controlled by a number of factors, involving the parameters of the system, as is more fully discussed in the aforementioned copending Bradley application. However, it is unnecessary to a complete understanding of the present invention to discuss these factors and their effects in detail in the present specification.

Considering now the specific problem, to the solution of which the present invention is directed, and the means in accordance with the invention for solving it, as hereinbefore mentioned if, in a heterodyne-frequency-modulation system, the rate of variation of the frequency of the modulated input signal is relatively high, the variations in the frequency of the output signal will cease to be directly proportional to the variations in frequency of the modulated input signal and distortion will be introduced in the form of a component in the output signal whose frequency tends to vary as a function of the rate of change with time of the frequency of the modulated input signal. The nature of this distortion can best be appreciated by considering the frequency-modulated input signal as consisting of a fixed frequency component (i. e. the nominal I.-F. input frequency) plus a variable component representative of the modulation. Similarly the frequency-modulated output signal may be regarded as consisting of a fixed component (i. e. the carrier frequency) plus a variable component representative of the modulation. It is then found that there exists an expression relating the variable component of the frequency-modulated output signal to the variable component of the frequency-modulated input signal, the instantaneous frequency of the input signal and the rate of change thereof with time. For a conductance-modulated oscillator of the sort hereinbefore discussed, operated at a relatively low duty cycle and with the first lower sideband locked, this expression is:

$$\omega_{out}=\omega_{in}-\frac{\gamma_{11}}{\gamma_{11}^2+(\omega_m-\mu)^2}\cdot\frac{d\omega_m}{dt} \qquad (1)$$

in which $\omega_{out}$ is the variable component of the frequency-modulated output signal, $\omega_{in}$ is the variable component of the frequency-modulated input signal, $\gamma_{11}$ is the half-bandwidth of the loaded primary in the equivalent circuit of Fig. 1, $\mu$ is the magnitude of the displacement of the locked sideband from the resonant frequency of the primary, and $\omega_m$ is the instantaneous frequency of the input frequency-modulated signal, which varies with time. The latter term in this expression represents the distortion component in the frequency-modulated output signal which, as above mentioned, is a function both of the instantaneous value of the frequency-modulated input signal and the first derivative thereof with respect to time. It will be apparent that the distortion term increases with an increase in the rate of variation of the frequency-modulated input signal as well as with the reduction in the difference between $\omega_m$ and $\mu$.

It has been determined that, at least under certain circumstances, this form of distortion can be eliminated or substantially reduced through the expedient of appropriately predistorting the frequency-modulated input signal before it is applied to modulate the oscillator. Thus, it has been determined that, in a heterodyne modulated oscillator operated Class C at a relatively low duty cycle, and where the first lower sideband in the output from the oscillator is locked, the necessary predistortion can be effected, to achieve complete compensation, by passing the modulated input signal through a frequency discriminatory passive transducer having a transfer impedance characteristic given by the expression:

$$Z_{12}=k[\gamma_{11}+j(\omega_m-\mu)] \qquad (2)$$

where $k$ is an arbitrary real constant, and $\gamma_{11}$, $\omega_m$ and $\mu$ are as hereinbefore defined with reference to Equation (1).

Similarly, in the case in which the first upper side band is locked, the desired compensation may be accomplished completely by passing the frequency-modulated input signal through a passive transducer whose transfer impedance characteristic is given by the expression:

$$Z_{12}=k[\gamma_{11}-j(\omega_m-\mu)] \qquad (3)$$

where the symbols used are of the same significance as in the previous expression.

In practice, the predistorting transducer may comprise a portion of the amplifier through which the intermediate frequency signal is supplied to drive the oscillator which is heterodyne-modulated. Such an arrangement is illustrated, by way of example, in the embodiment according to Fig. 4, in which a frequency-modulated I.-F. input signal from source 50 is supplied to the input of a heterodyne-modulated oscillator 51 through an amplifier comprising pentode vacuum tubes 52 and 53 connected in cascade by means of a coupling network comprising inductor 54 of inductance L, condenser 55 of capacitance C, resistor 56 of resistance $R_1$ and resistor 57 of resistance $R_2$. In this arrangement the heterodyne-frequency-modulated oscillator 51 may be, for example, of the form hereinbefore described with reference to Fig. 3. The coupling network between the amplifier stages may be designed in accordance with the invention to effect the necessary predistortion of the input signal to substantially reduce or eliminate the undesired distortion components in the output from the heterodyne-frequency-modulated oscillator 51. In the arrangement shown, the coupling network is essentially a simple series tuned circuit with dissipation in both elements, and although this relatively simple form of coupling provides but an approximation to the transfer impedance characteristic as prescribed by Equation (2), it has been determined that it is capable of providing a high degree of compensation in the case where the heterodyne-modulated oscillator is operating with its first lower sideband locked. The attainment of such results is, of course, predicated upon the appropriate selection of the values of the coupling network parameters, as will presently be demonstrated.

In the coupling network according to Fig. 4, the impedance $Z_{AB}$ between points A and B is given, in accordance with well-known principles of network theory, by the expression:

$$Z_{AB}=k'\frac{[\gamma+j(\omega-\omega_r)][\gamma+j(\omega+\omega_r)]}{a\gamma+j\omega} \qquad (4)$$

where:

$$\left.\begin{aligned}\gamma&=\frac{CR_1R_2+L}{2LCR_2}\\ \omega_r&=\sqrt{\frac{R_1+R_2}{LCR_2}-\gamma^2}\\ a&=\frac{2L}{L+CR_1R_2}\\ \text{and}\quad k'&=L\end{aligned}\right\} \qquad (5)$$

The form of this expression is such, it will be observed, that the impedance defined by it is characterized in having two complex conjugate zeroes and a real pole.

The Equations (5) may be solved to yield the expressions for $R_1$, $R_2$ and C explicitly in terms of the parameters $k'$, $a$, $\gamma$, $\omega_r$ and the inductance L as follows:

$$\left.\begin{aligned} R_1 &= L\gamma(2-a) \\ R_2 &= \frac{L}{a\gamma}[\omega_r^2+\gamma^2(1-a)^2] \\ \text{and}\quad C &= \frac{1}{L[\omega_r^2+\gamma^2(1-a)^2]} \end{aligned}\right\} \qquad (6)$$

If it is assumed that $\omega_r=\mu$, the magnitude of the displacement of the locked lower sideband from the resonant frequency of the primary, in Equation (2); and that $\gamma=\gamma_{11}$, the half bandwidth of the loaded primary, then, if the bandwidth of the intermediate frequency is not unduly wide, distortion in the output of the heterodyne modulated oscillator will become substantially non-existent if the value of the parameter $a$ in Equation (4) is selected so as to satisfy the relation:

$$1+\left(\frac{\omega_{IF}+\mu}{\gamma_{11}}\right)^2=a+\frac{\omega_{IF}^2}{a\gamma_{11}^2} \qquad (7)$$

where $\omega_{IF}$ is the mean intermediate frequency.

If, for example, $\omega_{IF}=\mu=\gamma_{11}$, the value of $a$ will be approximately 0.209. This is within the range of values of $a$ which are susceptible of physical realization, since $a=0$ when $R_2=\infty$ and $a=2$ when $R_1=0$.

Once the values of the parameters $\gamma$, $\omega_r$ and $a$ have been ascertained for any specific case, it is readily possible, from Equations (6) to determine the values of L, C, $R_1$, and $R_2$ in the coupling network according to Fig. 8. Before doing this, however, it is first necessary to specify the impedance level of the coupling network between points A and B. For practical purposes, this level is limited by the inherent capacitance with respect to ground of amplifier tube 80 and the grid-to-ground capacitance of tube 81.

For example, if tubes 80 and 81 are type 6AK6 and are operated at an intermediate frequency of 50 megacycles, values of the circuit constants which will satisfy Equations (5) and provide a suitable impedance level are:

$L=4.63\times10^{-8}$ henries
$C=135$ $\mu\mu$-farads
$R_1=26.2$ ohms
$R_2=112.3$ ohms To provide adequate gain, coupling condenser 88 should be of the order of magnitude of 50 $\mu\mu$fd.

It will be understood, of course, that the invention has been described by reference to a representative practical embodiment especially adapted for use under a predetermined specific set of circumstances. However the principles of the invention have been set forth with sufficient scope and detail to indicate clearly and fully, to anyone skilled in the art, exactly how to proceed in applying them under various different circumstances and wherever the need for the invention may arise. Accordingly it will appear that there is no intention to limit the scope of the invention to the particular embodiment and to the specific circumstances hereinbefore discussed.

I claim:

1. In a heterodyne frequency-modulation system, a source of a signal of predetermined frequency, means for mixing said last-named signal with an input signal of modulated frequency to yield a third signal comprising a plurality of frequency components, at least one of which tends to be frequency-modulated in some degree in substantial accordance with the frequency modulation of said input signal, means for substantially reducing the tendency of said one component to be frequency-modulated, whereby there are imparted to a second of said components frequency variations according in some degree to the modulation of said input signal, the frequency of said last-named component also tending to vary as a function of the rate of change with time of the frequency of said modulated input signal, means for substantially reducing said last-named variation, said means comprising a passive electrical transducer included in the input circuit to said modulator and operative to distort said frequency-modulated input signal, and means for deriving an output signal which varies in frequency in accordance with the frequency variations of said second component.

2. In a heterodyne frequency-modulation system, an oscillator having a tank circuit resonant at a predetermined frequency, means responsive to an input frequency-modulated signal for controlling said oscillator so as to produce in said tank circuit a fundamental component substantially equal in frequency to the resonant frequency of said tank circuit, and a sideband component which tends to be frequency-modulated in some degree in substantial accordance with the frequency-modulation of said input signal, means for substantially reducing the tendency of said sideband component to be frequency-modulated, whereby there tend to be imparted to said fundamental component frequency variations according in some degree to the modulation of said input signal and also frequency variations which are a function of the rate of change with time of the frequency of said modulated input signal, means for substantially reducing the magnitude of said last-named variations, said means comprising a passive electrical transducer included in the input circuit to said oscillator and operative to distort said frequency-modulated input signal, and means for deriving from said oscillator an output signal whose frequency varies in substantial accordance with the frequency variations of said fundamental component.

3. In a heterodyne frequency-modulation system, an oscillator having a tank circuit resonant at a predetermined frequency, means responsive to an input frequency-modulated signal for controlling said oscillator so as to produce in said tank circuit a fundamental component substantially equal in frequency to the resonant frequency of said tank circuit and a first lower sideband component which tends to be frequency-modulated in some degree in substantial accordance with the frequency-modulation of said input signal, means for substantially reducing the tendency of said sideband component to be frequency-modulated, whereby there tend to be imparted to said fundamental component frequency variations according in some degree to the modulation of said input signal and also frequency variations which are a function of the rate of change with time of the frequency of said input signal, a transducer for supplying input frequency-modulated signals to said oscillator and for predistorting said input signals, whereby to reduce said last-named variations, said transducer having a transfer impedance characteristic $Z_{12}$ substantially according to the expression:

$$Z_{12}=k[\gamma_{11}+j(\omega_m-\mu)]$$

in which $\gamma_{11}$ is the half bandwidth of said resonant tank circuit when loaded, $\omega_m$ is the instantaneous frequency of said input signal, $\mu$ is the magnitude of the displacement of the mean frequency of said sideband component from the resonant frequency of said tank circuit and $k$ is an arbitrary real constant, and means for deriving from said oscillator an output signal whose frequency varies in substantial accordance with the frequency variations of said fundamental component.

4. In a heterodyne frequency-modulation system, an oscillator adapted to oscillate at a predetermined frequency, means responsive to an input frequency-modulated signal for controlling said oscillator to produce in the output circuit of said oscillator a fundamental component substantially equal in frequency to said predetermined frequency and a first lower sideband component which tends to be frequency-modulated in some degree in substantial accordance with the frequency-modulation of said input signal, means for substantially reducing the tendency of said sideband component to be frequency-modulated, whereby there tend to be imparted to said fundamental component frequency variations according in some degree to the modulation of said input signal and also frequency variations which are a function of the rate of change with time of the frequency of said input signal, an amplifier for supplying input frequency-modulated signals to said oscillator and for predistorting said input signals, whereby to reduce said last-named frequency variations, said amplifier including at least one vacuum tube stage having a load impedance which is characterized in having a pair of complex conjugate zeroes and a real pole, and means for deriving from said oscillator an output signal whose frequency varies in substantial accordance with the frequency variations of said fundamental component.

5. In a heterodyne frequency-modulation system, an oscillator adapted to oscillate at a predetermined frequency, means responsive to an input frequency-modulated signal for controlling said oscillator to produce in the output circuit of said oscillator a fundamental component substantially equal in frequency to said predetermined frequency and a first lower sideband component which tends to be frequency-modulated in some degree in substantial accordance with the frequency-modulation of said input signal, means for substantially reducing the tendency of said sideband component to be frequency-modulated, whereby there tend to be imparted to said fundamental component frequency variations according in some degree to the modulation of said input signal and also frequency variations which are a function of the rate of change with time of the frequency of said input signal, an amplifier for supplying input frequency-modulated signals to said oscillator and for predistorting said input signals, whereby to reduce said last-named frequency variations, said amplifier including at least one vacuum tube stage having a load impedance comprising an inductor and a condenser connected in series, said inductor having resistance in series therewith and said condenser having resistance in shunt therewith, and means for deriving from said oscillator an output signal whose frequency varies in substantial accordance with the frequency variations of said fundamental component.

6. In a heterodyne frequency-modulation system, an oscillator having a tank circuit resonant at a predetermined frequency, means responsive to an input frequency-modulated signal for controlling said oscillator to produce in said tank circuit a fundamental component substantially equal in frequency to the resonant frequency of said tank circuit and a first lower sideband component which tends to be frequency-modulated in some degree in substantial accordance with the frequency-modulation of said input signal, means for substantially reducing the tendency of said sideband component to be frequency-modulated, whereby there tend to be imparted to said fundamental component frequency variations according in some degree to the modulation of said input signal and also frequency variations which are a function of the rate of change with time of the frequency of said input signal, an amplifier for supplying input frequency-modulated signals to said oscillator and for predistorting said input signals, whereby to reduce said last-named frequency variations, said amplifier including at least one vacuum tube stage having a load impedance comprising an inductor of inductance L and a condenser of capacitance C connected in series, said inductor having resistance $R_1$ in series therewith and said condenser having resistance $R_2$ in shunt therewith, the values of said inductor, condenser and resistances satisfying the requirement $0 \leqslant a \leqslant 2$, and means for sions:

$$R_1 = L\gamma_{11}(2-a)$$

$$R_2 = \frac{L}{a\gamma_{11}}[\omega_r^2 + \gamma_{11}^2(1-a)^2]$$

and $$C = \frac{1}{L[\omega_R^2 + \gamma_{11}^2(1-a)^2]}$$

where $\gamma_{11}$ is the half bandwith of said resonant tank circuit when loaded, $\omega_r$ is the magnitude of the displacement of the mean frequency of said sideband component from the resonant frequency of said tank circuit and $a$ is a constant satisfying the requirement $0 \leqslant a \leqslant 2$, and means for deriving from said oscillator an output signal whose frequency varies in substantial accordance with the frequency variations of said fundamental component.

7. In a heterodyne frequency-modulation system, an oscillator adapted to oscillate at a predetermined frequency, means responsive to an input frequency-modulated signal for controlling said oscillator to produce in the output circuit of said oscillator a fundamental component substantially equal in frequency to said predetermined frequency and a first lower sideband component which tends to be frequency-modulated in some degree in substantial accordance with the frequency-modulation of said input signal, means for substantially reducing the tendency of said sideband component to be frequency-modulated, whereby there tend to be imparted to said fundamental component frequency variations according in some degree to the modulation of said input signal and also frequency variations which are a function of the rate of change with time of the frequency of said input signal, an amplifier for supplying to said oscillator a frequency-modulated carrier wave signal whose carrier frequency is of the order of 50 megacycles and for predistorting said input signal, whereby to reduce said last-named frequency variations, said amplifier including at least one vacuum tube stage having a load impedance comprising an inductor of inductance L and a condenser of capacitance C connected in series, said inductor having resistance $R_1$ in series therewith and said condenser having resistance $R_2$ in shunt therewith, the values of said inductor, condenser and resistances being substantially:

$L=4.6\times10^{-8}$ henries,
$C=130$ micromicrofarads,
$R_1=26$ ohms, and
$R_2=110$ ohms, and means for deriving from said oscillator an output signal whose frequency varies in substantial accordance with the frequency variations of said fundamental component.

STEPHEN W. MOULTON.

REFERENCES CITED

The following references are of record in the file of this patent:

UNITED STATES PATENTS

| Number | Name | Date |
|---|---|---|
| 2,334,726 | Rankin | Nov. 23, 1943 |
| 2,410,489 | Fitch | Nov. 5, 1946 |